United States Patent [19]

Galumbeck

[11] Patent Number: 4,899,404
[45] Date of Patent: Feb. 13, 1990

[54] ELEVATION SYSTEM FOR A BED ASSEMBLY

[76] Inventor: Michael H. Galumbeck, 5577 Vantage Point Rd., Columbia, Md. 21044

[21] Appl. No.: 191,879

[22] Filed: May 9, 1988

Related U.S. Application Data

[63] Continuation-in-part of Ser. No. 31,221, Mar. 27, 1987, Pat. No. 4,742,586, which is a continuation of Ser. No. 802,053, Nov. 25, 1985, abandoned.

[51] Int. Cl.⁴ .................. A61G 7/00; A47C 23/04
[52] U.S. Cl. .................................. 5/72; 5/250; 5/411; 5/465; 16/366; 16/368; 24/237
[58] Field of Search .................. 5/66–68, 5/70–72, 79, 433, 260, 411, 465, 250; 24/237; 16/366, 368

[56] References Cited

U.S. PATENT DOCUMENTS

| | | | |
|---|---|---|---|
| 1,559,119 | 4/1922 | Miller | 5/411 |
| 1,842,873 | 7/1930 | Leeking | 5/411 |
| 4,095,296 | 6/1978 | Ferro | 5/69 |
| 4,188,677 | 2/1980 | Zur | 5/66 |
| 4,258,445 | 3/1981 | Zur | 5/66 |
| 4,349,924 | 9/1982 | Zur | 5/68 |
| 4,361,917 | 12/1982 | Wilson | 5/68 |

FOREIGN PATENT DOCUMENTS

| | | | |
|---|---|---|---|
| 2433516 | 1/1976 | Fed. Rep. of Germany | 5/465 |
| 426238 | of 0000 | Switzerland | 5/465 |
| 247408 | 3/1947 | Switzerland | 5/465 |

*Primary Examiner*—Alexander Grosz
*Attorney, Agent, or Firm*—Sixbey, Friedman, Leedom & Ferguson

[57] ABSTRACT

A system for elevating the head portion of a bed assembly defined by a mattress and a box spring foundation, including a double pivot hinge secured to the border wires on either side of the mattress, a double linkage hinge secured to the upper border wire assemblies connecting the foundation to the mattress for maintaining the mattress in its position of alignment on the foundation, and an elevating mechanism for jointly raising and lowering the corresponding head portions of the mattress and foundation.

21 Claims, 4 Drawing Sheets

ELEVATION SYSTEM FOR A BED ASSEMBLY

This application is a continuation in part application of Ser. No. 031,221 filed Mar. 27, 1987, now U.S. Pat. No. 4,742,586, which is a continuation of application Ser. No. 802,053 filed Nov. 25, 1985, now abandoned.

FIELD OF THE INVENTION

The present invention generally involves the field of technology pertaining to a bed assembly defined by a mattress and a foundation. More particularly, the invention relates to an improved system for elevating or pivoting corresponding portions of a mattress and foundation.

DESCRIPTION OF THE PRIOR ART

The concept of providing a bed wherein portions of the bed may be bent at various angles for the purpose of conforming the support surface defined by the bed to different desired angular positions of the human body is well-known. A bed of this type has heretofore found greatest utility in hospital or other institutional patient care facilities wherein the patient must spend a great deal of time in bed and therefore requires that the bed be adjustable in contour in order to accommodate different bodily positions during the waking hours. For example, it is desirable to at least elevate the head portion of the bed to permit the patient to read, watch television or partake of meals. It is further desirous to elevate or angle the lower portion of the bed for raising the legs of the patient for providing an angled support beneath the knees. The structural considerations required for the manufacture of beds of this type are quite complex and expensive to implement. Therefore, beds provided with elevatable or adjustable features have generally been confined to the medical and institutional markets rather than the retail consumer market.

The construction of a bed having at least an elevatable head portion requires several important considerations. First, the mattress may have to be provided with a suitable hinge construction which will permit pivoting of the head portion of the mattress to the desired elevated position without disturbing the otherwise uniform support afforded by the mattress, whether in its elevated or flat position. Second, the foundation must also be provided with an appropriate hinge construction which permits the corresponding head portion of the foundation to be jointly elevated with the head portion of the mattress in order to provide full underlying support for the mattress in both the elevated and flat positions. Third, the elevating of corresponding overlying portions of the mattress and foundation results in a foreshortening of the foundation due to the substantial thicknesses of the two members, thereby tending to cause the mattress to slide or shift out of its initial flat position of alignment on the foundation. This latter situation therefore requires that some means be provided for restraining the mattress in its position of alignment on the foundation. Fourth, the elevation procedure itself should be accomplished through a mechanism which is smooth, quiet and reliable in operation, and of sufficient compactness so as to be unobtrusively concealed within the foundation when it is not being utilized.

Attempts to provide a hinged mattress construction to permit portions of a mattress to pivot relative to other portions thereof have been previously made, as illustrated by the Kaiserman (Letters U.S. Pat. No. 1,554,098), and Ferro (Letters U.S. Pat. No. 4,095,296). Ferro also discloses the use of a hinged mattress in combination with a hinged foundation support, and such hinged foundation supports are also illustrated by Letters U.S. Pat. No. 2,552,128 to Waxman and Letters U.S. Pat. No. 4,349,924 to Zur as well as by Swiss patent No. 426,238. Although these patents disclose both foundation and mattress constructions adapted to pivot one section of a bed relative to another, they do not provide maximum comfort and support by elevating a mattress simultaneously in two stages and at differential angles to create a substantially concave, arcuately curved configuration. This method of elevating a mattress is the ideal manner for elevation if the upper body of an occupant of the bed is to receive the best support possible.

A problem which is experienced with elevated beds is mattress slippage. As the foundation and overlying mattress are elevated, the mattress will tend to slip out of position unless it is attached to an underlying foundation such as a box spring. Various strap arrangements have been proposed to facilitate such attachment as shown by Letters U.S. Pat. Nos. 1,842,873 to Leeking and 1,559,119 to Miller. The disadvantage of most such strap attachments is that they inhibit securing a sheet to a mattress by tucking the sheet between the mattress and the supporting box spring in the conventional manner.

SUMMARY OF THE INVENTION

It is an object of the invention to provide an improved system for pivoting or elevating corresponding portions of a bed assembly defined by a mattress and foundation.

It is another object of the invention to provide an improved bed assembly having an elevatable head portion for supporting the user in an extremely comfortable position for reading, watching television or other activity.

It is a further object of the invention to provide a bed elevation system which is smooth, quiet and reliable in operation, and of such compactness as to be concealable within the bed structure when it is not being utilized.

It is yet another object of the invention to provide an improved hinge structure for a mattress which permits the bending of the mattress while retaining its structural integrity.

It is yet a further object of the invention to provide an improved hinge structure for a foundation which permits the bending of the foundation while retaining its structural integrity.

It is yet a further object of the invention to provide an improved restraining means for maintaining a mattress in its position of alignment on a foundation, whether the mattress is in an elevated or flat position while facilitating a normal bed making operation.

It is still another object of the invention to provide an improved mechanism for elevating the corresponding head portions of a mattress and foundation.

The foregoing and other objects of the invention are realized through an improved bed elevation system which is defined by a combination of several features. The mattress is provided with a pair of opposed hinges, each of which is capable of a double pivot action and includes a pair of resilient members which attach directly to the existing border wires of the mattress and provide full support for the corresponding edge portions of the mattress. The foundation is provided with a pair of opposed hinge structures which are attached to the upper border wire of the foundation and is capable of being disposed in a compressed position and an extended position, the latter position serving to define a continuation of the border wire and providing full edge support of the foundation at their corresponding locations. The bottom of the foundation is provided with at least two spaced transverse hinges which permit a contoured bending of the foundation during the elevation of its head portion. The mattress is restrained from moving out of its position of alignment with respect to the foundation by a plurality of strap assemblies, each of which includes a strap having one end attached directly to a junction of the foundation wire grid and the other end being detachably secured to a corresponding loop carried by the mattress. The corresponding head portions of the mattress and foundation are jointly raised and lowered by an elevating mechanism which is carried by a section of the foundation and includes a rotatable threaded rod on which a correspondingly threaded bracket is carried, with the bracket being attached to the underside of the foundation head portion by a yoke and transverse pull bar, whereby rotation of the rod in either direction causes linear movement of the bracket in a corresponding direction to raise or lower the corresponding head portions of the mattress and foundation. The section of the foundation with the elevating mechanism may be unitary with or separable from the remainder of the foundation.

Other objects, advantages and features of the invention shall become apparent from he following detailed description of the preferred embodiments thereof, with reference being made to the accompanying drawings wherein like reference characters refer to corresponding parts of the several views.

DETAILED DESCRIPTION OF THE PREFERRED EMBODIMENTS

Figure 1:
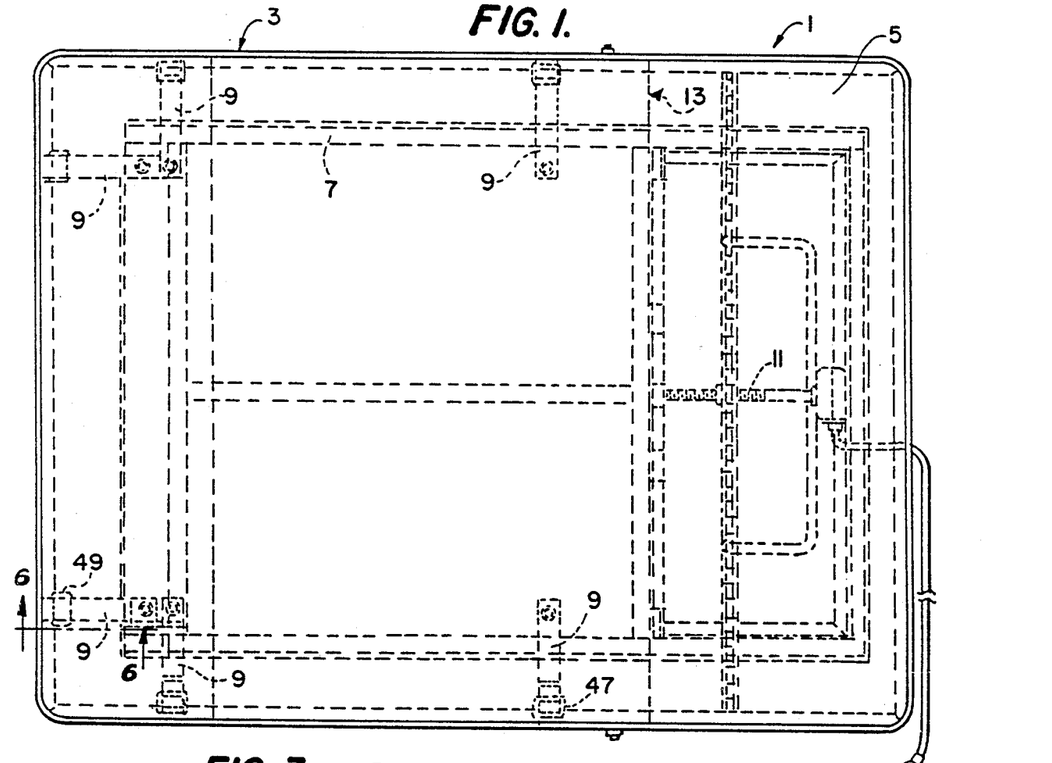
FIG. 1 is a plan view of a bed assembly defined by a mattress and a box spring foundation, and incorporating the elevation system of the present invention in accordance with a preferred embodiment thereof.

A bed elevation system 1, in accordance with a preferred embodiment of the invention, is generally shown in FIG. 1 incorporated within a bed assembly 3 that is basically defined by a mattress 5 supported on a box spring foundation 7.

Mattress 5 is secured in its position of alignment on foundation 7 by a plurality of strap assemblies 9. The corresponding head portions of mattress 5 and foundation 7 are jointly raised and lowered by an elevating mechanism 11 about a common hinge line, shown generally at 13, that extends transversely across bed assembly 1. As apparent, hinge line 13 basically defines a joint bending area for corresponding portions of mattress 5 and foundation 7. The structural details of each strap assembly 9, elevating mechanism 11 and the internal structures of both mattress 5 and foundation 7 which permit same to be jointly pivoted about common hinge line 13 shall hereinafter be described with reference to remaining FIGS. 2-9.

Figures 2, 3, 4, 4A:
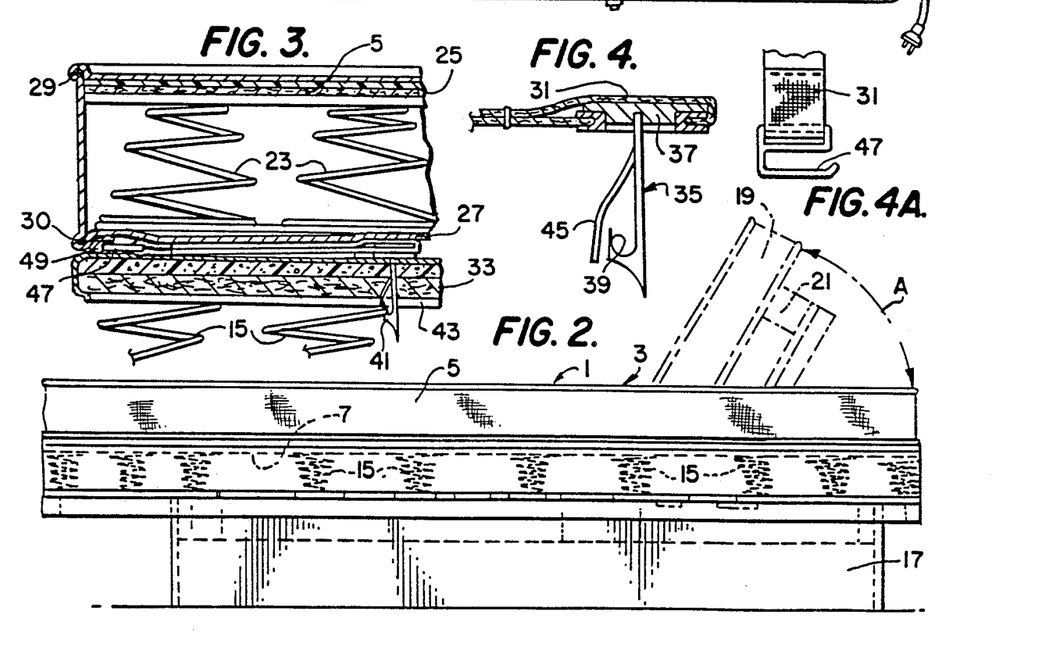
FIG. 2 is a side elevational view of the bed assembly of FIG. 1, showing the head portion of the bed, including corresponding head portions of the mattress and foundation, in an elevated position, as depicted in phantom lines.
FIG. 3 is an enlarged fragmentary vertical sectional view taken on the line 3—3 of FIG. 1 and depicting a strap assembly for maintaining the mattress in its position of alignment on the foundation.
FIG. 4 is a further enlarged vertical sectional view depicting a preferred means for anchoring the strap assembly of FIG. 3 to a grid wire junction of the foundation.
FIG. 4A is a sectional view showing the free end of a strap forming the strap assembly of FIG. 3 with a buckle attached thereto for detachable connection to a corresponding loop carried by the mattress.

As shown in FIG. 2, mattress 5 overlies foundation 7, with the latter being partially defined by a plurality of spaced internal coil springs 15 of conventional design. Bed assembly 3 maybe supported in an elevated position on a base 17 or other appropriate support well-known in the art. As shown in phantom lines, a mattress head portion 19 and corresponding foundation head portion 21 are capable of being raised and lowered in the opposite directions indicated by double arrow A between the fully elevated and flat positions shown. Head portions 19 and 21 are substantially of the same size, whereby the joint pivoting of same abut common hinge line 13 necessarily causes a foreshortening of head portion 21 with respect to overlying head portion 19, as clearly shown in FIG. 2. This foreshortening results from the substantial thicknesses of head portions 19 and 21, and also if the remaining portion of mattress 5 is not permitted to shift from its position of alignment on the remaining portion of foundation 7. As shall hereinafter be rendered apparent, elevation system 1 permits a smooth and contoured elevation of head portions 19 and 21 in order to provide optimal comfort and support for the user of bed assembly 3 in a manner not previously realized through conventional technology.

The details of strap assembly 9 shall now be described with reference to FIGS. 3, 4 and 4A. Mattress 5 is shown provided with a plurality of spaced internal coil springs 23 disposed between an upper layer 25 and a lower layer 27, the structural characteristics of which may comprise any standard construction known in the art. The upper and lower peripheral edges of mattress 5 include an upper border wire 29 and a lower border wire 30. Each strap assembly 9 includes an elongate strap 31 formed from an appropriate fabric material and securely attached to an upper layer 33 of foundation 7. This is accomplished by means of a locking member 35 that includes a head portion 37 secured to one end of strap 31 and a hook portion 39 which is inserted through upper layer 33 and engages a grid wire junction 41 defined by coil spring 15 and a wire grid 43 of foundation 7. A guard 45 may be carried by locking member 35 to prevent dislodgement of grid wire junction 41 therefrom. As apparent, this arrangement serves to securely lock one end of strap 31 to foundation 7 and prevents its removal therefrom. The other end of strap 31 is provided with a hook buckle 47 of any appropriate design for detachably securing strap 31 to a corresponding fabric loop 49 that is attached to the peripheral edge of mattress 5, preferably by sewing loop 49 onto border wire 30. The engagement of buckle 47 to loop 49 is more clearly shown in FIG. 1, wherein there is also depicted a preferred orientation of plural strap assemblies 9. In this case, two pairs of assemblies 9 are each disposed at right angles at the foot of bed assembly 3, while two individual strap assemblies 9 extend transversely from the opposite sides of bed assembly 3 adjacent common hinge line 13. Through this configuration, mattress 5 cannot be shifted from its position of alignment on foundation 7, notwithstanding the simultaneous joint elevation of mattress head portion 19 and foundation head portion 21, and the foreshortening of head portion 21, in the manner shown in FIG. 2. The construction of strap assembly 9 as herein described affords considerable strength for its intended function and prevents any damage to the conventional fabric materials forming either lower layer 27 of mattress 5 or upper layer 33 of foundation 7. The fabric material forming strap 31 and its corresponding loop 49 may be of any well-known in the art, including those formed from synthetic or natural fibers. The manner in which strap 31 and loop 49 may be sewn or constructed, and the manner in which locking member 35 is attached to strap 31 may be in accordance with any procedure well-known in the art and deemed suitable for the practice of the invention as disclosed herein.

Figures 5, 5A:
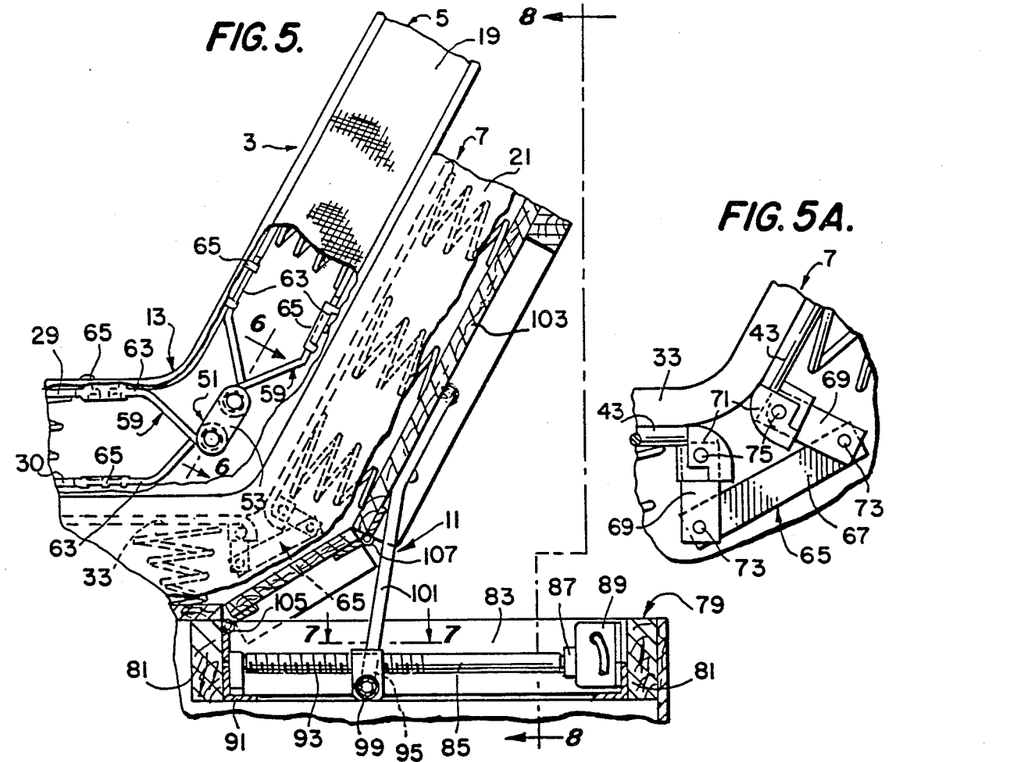
FIG. 5 is an enlarged fragmentary vertical sectional view showing the head portion of the bed assembly in its elevated position.
FIG. 5A is an enlarged fragmentary side elevational view, similar to FIG. 5, showing the hinge structure carried by the upper border wire of the foundation in its compressed position.

The internal structures of mattress 5 and foundation 7 which permit their respective head portions 19 and 21 to jointly pivot about common hinge line 13 shall now be described with initial reference to FIG. 5. As shown therein, mattress 5 is provided with a double pivot hinge 51 on opposite sides thereof. Though only one hinge 51 is shown, the structure and function of both hinges 51 are exactly the same. Each hinge 51 includes a central portion defined by a pair of opposed plates 53 secured together in a spaced disposition by a pair of circular-shaped spacers 55 and a pair of rivets 57 which lock plates 53 to spacers 55 in the manner shown in FIG. 6. The central axes of spacers 55 serve to define parallel double pivot axes which are perpendicular to the planes of plates 53. Hinge 51 further includes a pair of resilient members 59, each of which is preferably formed from a single length of spring wire provided with a central twist loop 61 therein and a pair of parallel legs 63. Each twist loop 61 is wrapped around a corresponding spacer 55, whereby legs 63 extend outwardly therefrom and are attached to corresponding upper and lower border wires 29 and 30 of mattress 5 by means of clamps 65 of any appropriate design. Twist loops 61 are free to rotate about their respective spacers 55, and thereby provide a double pivot action at the central portion of hinge 51. Because of the resilient nature of each member 59 and the presence of twist loop 61 therein, it is further apparent that parallel legs 63 are compressible against spring tension. This serves to provide the same resilient support for the edge of mattress 5 that is normally provided by border wires 29 and 30 when mattress 5 is disposed in its flat position. During the raising of head portion 19 in the position shown in FIG. 5, hinge 51 affords a smooth and contoured bending of mattress 5 about common hinge line 13, while maintaining full resilient edge support of mattress 5 on both sides thereof and preventing premature wear or damage to upper layers 25 and 27.

Figures 5B, 5C, 5D, 6, 7:
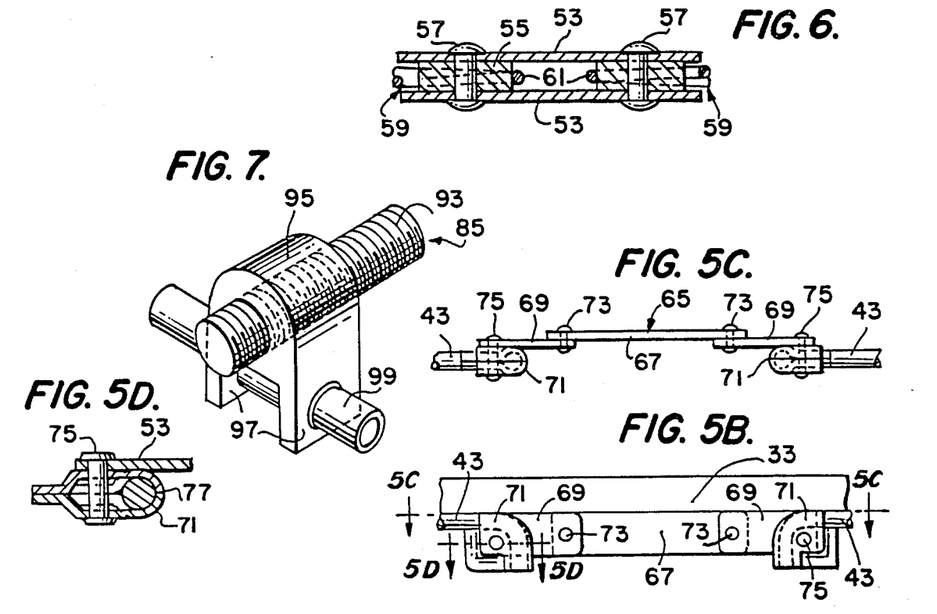
FIG. 5B is a fragmentary side elevational view, showing the hinge structure of FIG. 5A in its extended position.
FIG. 5C is a fragmentary plan view taken on the line 5C—5C of FIG. 5B.
FIG. 5D is an enlarged fragmentary horizontal sectional view, taken on the line 5D—5D of FIG. 5B.
FIG. 6 is an enlarged horizontal sectional view through the hinge structure on one side of the mattress, taken on the line 6—6 of FIG. 5.
FIG. 7 is a fragmentary isometric view of the threaded rod forming a part of the elevating mechanism shown with the threaded bracket thereon, and taken on the line 7—7 of FIG. 5.

The internal structure of foundation 7 which permits head portion 21 thereof to bend about common hinge line 13 shall now be described with reference to FIG. 5, and particularly to FIGS. 5A-5D. As depicted therein, the upper portion of foundation 7 is provided with a double linkage hinge 65 on opposite sides thereof in the vicinity of common hinge line 13 and disposed substantially directly below corresponding hinges 51 of mattress 5. Though only one hinge 65 is shown, the structure and function of both hinges 65 are exactly the same. As seen in FIG. 5A, hinge 65 includes an elongate central link 67, a pair of elongate pivot links 69, and a pair of right angle sockets 71. One end of each pivot link 69 is pivotally connected to a corresponding end of central link 67 by a rivet 73 or similar fastener. The other end of each pivot link 69 is pivotally connected to a corresponding right angle socket 71 by a rivet 75 or similar fastener. As further show n, border wire 43 of foundation 7 at common hinge line 13 is severed and provided with downturned ends 77, each of which is secured within a corresponding socket 71. This is more clearly shown in FIG. 5D. When head portion 21 of foundation 7 is brought to the elevated position shown in FIG. 5, hinge 65 is disposed in the compressed condition shown in FIG. 5A, which condition is made possible by virtue of the double pairs of pivot points defined by rivets 73 and 75. When head portion 21 is lowered to position foundation 7 back in its normal flat position, hinge 65 is then disposed in an extended position, as shown in FIGS. 5B and 5C. In this latter position, central link 67 and pivot links 69 are disposed in linear alignment with border wire 43. As such, hinge 65 provides a structural continuation of border wire 43 to define continuous support for the opposed upper edge portions of foundation 7 in the vicinity of common hinge line 13. Accordingly, full perimeter edge support of foundation 7 is maintained when the latter is disposed in its flat position.

The details of elevating mechanism 11 shall now be described with particular reference to FIGS. 5, 7, 8 and 9. As initially seen in FIG. 5, mechanism 11 is incorporated within foundation 7 and secured to a wooden framework 79 forming the lower portion of foundation 7. Framework 79 may be conventionally constructed from a plurality of transverse and longitudinal two-by-four wooden strips 81 and 83, respectively, secured together in any appropriate manner. Because the height of framework 79 is limited to the maximum width of each two-by-four, it is therefore important that elevating mechanism 11 is of such configuration so as to be capable of being fully accommodated within framework 79 when head portion 21 is in its lowermost position. This accommodation is made possible by the novel structural arrangement of mechanism 11. As shown, mechanism 11 includes a rod 85 that is connected at one end through an appropriate journal bearing 87 to the output of an electric motor 89. The other end of rod 85 is secured in an opposite journal bearing 91 which is attached to framework 79. Operation of motor 89 causes rod 85 to rotate within its respective bearings 87 and 91. An appropriate manually operated reversing mechanism and switch assembly (not shown) is provided for motor 89 to permit its ON and OFF operation, and also rotation of rod 85 in either direction. Rod 85 is provided with a threaded portion 93 along the length thereof and a bracket 95 provided with a corresponding internal threading, wherein bracket 95 is threadedly secured to threaded portion 93 of rod 85 for linear travel therealong. The preferred configuration of bracket 95 is shown in FIG. 7 wherein bracket 95 includes a pair of downwardly extending leg portions 97 through which an elongate bar 99 is rotatably journaled. As depicted in FIG. 5, bar 99 is connected to the lower portion of a yoke 101, with the upper end of yoke 101 being secured to a bottom layer 103 of foundation 7. Bottom layer 103 is provided with at least two spaced transverse hinges 105 and 107 which are disposed beneath hinges 65. It is preferred that bottom layer 103 be defined by plural sections of wood or other suitable material disposed for pivoted movement in substantially the same direction when elevated by elevating mechanism 11. Because at least two transverse hinges 105 and 107 are provided, a very gentle contoured bend of a contoured configuration at the vicinity of hinge line 13 is realized when head portion 21 is raised to its elevated position. In this way, the sharp angled bend normally created by conventional elevating mechanism is entirely avoided. As apparent from FIG. 5, operation of motor 89 causes bracket 95 to move linearly back and forth across threaded portion 93 of rod 85, thus raising or lowering head portion 21 of foundation 7 and associated head portion 19 of mattress 5. When head portions 19 and 21 are disposed in their lowermost positions, bracket 95 is disposed towards the lefthand side of rod 85, when viewed in FIG. 5, and yoke 101 is entirely concealed below bottom layer 103 and within framework 79.

Figures 8, 9:
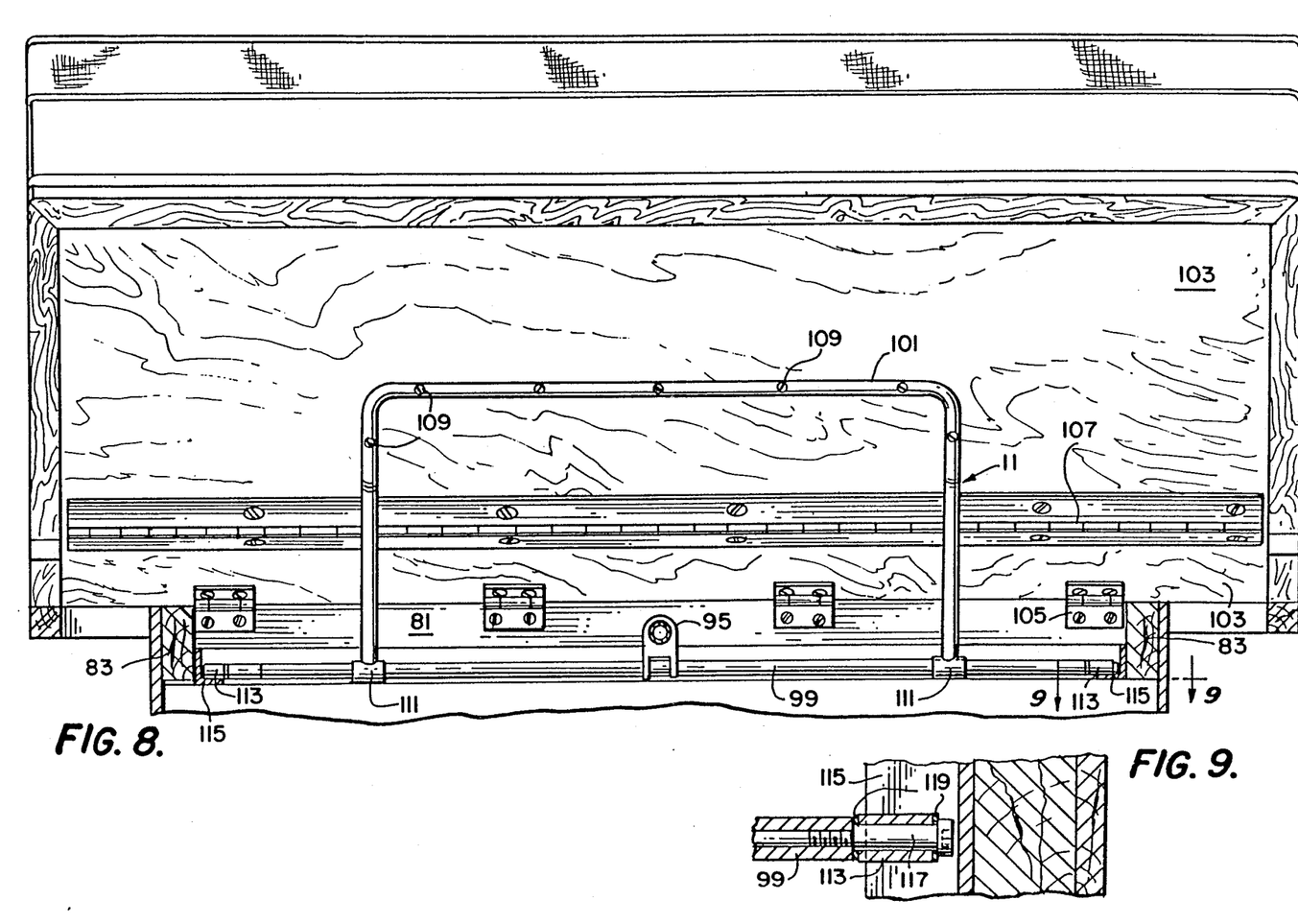
FIG. 8 is an elevational view, partly in section, taken on the line 8—8 of FIG. 5.
FIG. 9 is an enlarged fragmentary horizontal sectional view, taken on the line 9—9 of FIG. 8.

The details of bar 99 and yoke 101 shall be described with reference to FIGS. 8 and 9. As seen, yoke 101 is preferably of a U-shaped configuration, wherein the base portion thereof is secured to bottom layer 103 of foundation 7 by a plurality of screws 109 or similar mechanical fasteners. The leg portions of yoke 101 are angled slightly outwardly, as are clearly shown in FIG. 5, with each terminating in a transverse socket 111 through which bar 99 is rotatably received. The outer ends of bar 99 are each provided with a roller 113, wherein each roller 113 is disposed in rolling engagement with an elongate track surface defined by an inwardly directed leg of a right angle flange 115. As seen in FIG. 9, each roller 113 is preferably a cylindrical member formed of appropriate material and rotatably secured to its corresponding end of bar 99 by means of a bolt 117 and a pair of opposed washers 119. Through this arrangement, linear movement of bracket 95 along threaded portion 93 of rod 85 causes corresponding rolling engagement of bar 99 along flanges 115. Depending on the direction of rotation of rod 85, head portions 19 and 21 are caused to be either raised towards their uppermost position or lowered to their flat position. It is of course understood that head portions 19 and 21 may also be disposed in any intermediate position of elevation, as determined by the position of bracket 95 on threaded portion 93 of rod 85.

Figure 10:
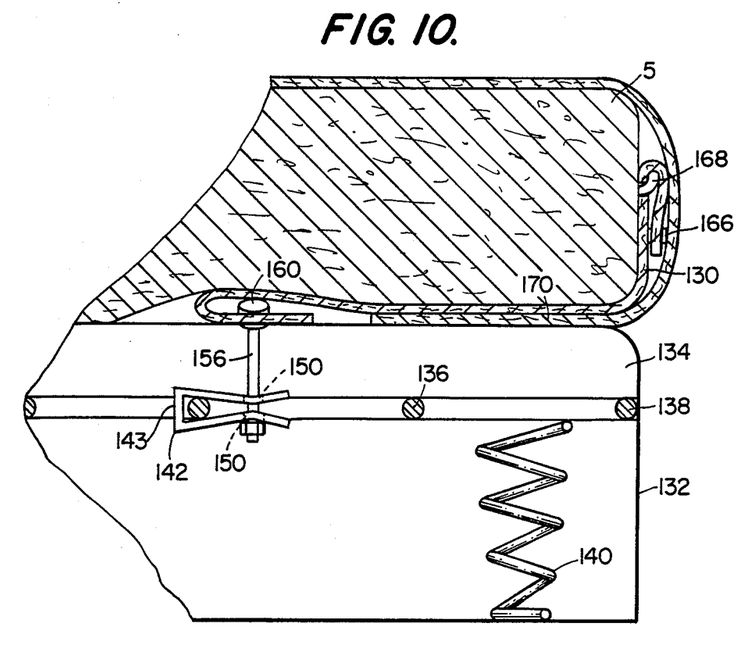
FIG. 10 is a sectional view showing a second embodiment of a strap attaching unit for a mattress.
Figure 11:
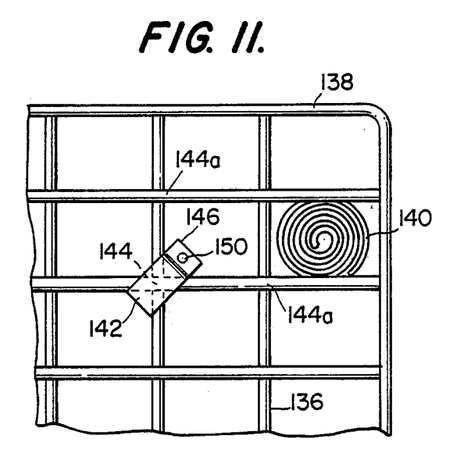
FIG. 11 is a plan view showing a section of a box spring to which the strap attaching unit of FIG. 10 is secured.
Figure 12:
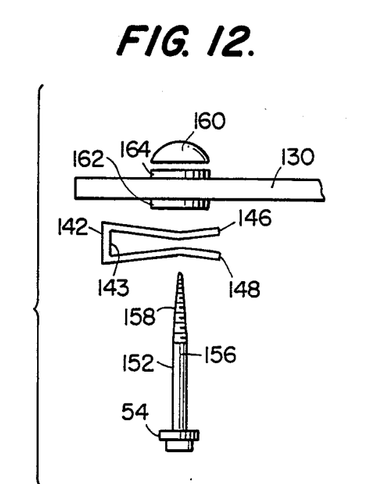
FIG. 12 is an exploded view of the strap attaching unit of FIG. 10.

Referring now to FIGS. 10-12, a second embodiment of the strap assembly 9 of FIGS. 3, 4 and 4A is illustrated. In this embodiment, straps 130 may be oriented in a manner similar to that shown in FIG. 1 to secure the mattress 5 in the area below the hinge line 13 to a box spring or similar foundation. In the embodiment of FIGS. 10-12, the straps 130 are secured to a box spring 132 during the manufacturing process. The box spring 132 includes an upper cushioning layer 134 of foam or similar material which overlies an upper wire grid 136 for the box spring extending between an upper border wire 138 which defines the perimeter of the box spring. The wire grid 136 is attached to coil springs 140 in the conventional manner.

During the formation of the box spring 132, substantially "U-shaped" metallic spring clips 142 are snapped across a junction 144 between two cross wires for the wire grid 136. The spring clips are spaced inwardly from the border wire 138 for a substantial distance and may be positioned in the locations shown for the innermost ends of the strap assemblies 9 in FIG. 1. There is preferably at least one free junction 144a between each clip 142 and the border wire 138, and there can be more if desired.

Preferably, each spring clip 142 includes a bridge section 143 extending at one end between superimposed legs ending in outwardly diverging end jaws 146 and 148 to facilitate snapping the clip over a grid junction. Aligned apertures 150 extend through each jaw and operate to receive a locking pin 152. This locking pin has an enlarged head 154 which is of greater diameter than the apertures 150 and a pointed shank 156 which will pass through these apertures. The pointed end of the shank is knurled at 158 to engage and lock with a locking aperture in a locking head 160.

One end of the strap 130 is provided with an aperture which is preferrably bounded by metal grommets 162 and 164 secured to opposite surfaces of the strap. Once the spring clip 142 is snapped into place across a junction 144 of the wire grid 136, the locking pin 152 is inserted upwardly through the aligned apertures 150, the cushioning layer 134 and the aperture in the end of the strap 130. The locking head 160 is now engaged with the knurls 158 to secure the strap to the locking pin. The shank 156 of the locking pin locks the clip 142 in place across the juncture 144.

When the mattress 5 is positioned on the box spring 132, the straps 130 secured to the box spring will extend outwardly between the mattress and box spring. The free ends of the straps are provided with conventional snap fasteners 166 or other suitable fastening means to permit the straps to be looped around and secured to loops 168 formed on the side surfaces of the mattress 5. As illustrated in FIG. 10, the clips 142 are spaced inwardly from the border wires 138 for a distance sufficient to permit a sheet 170 and other bedcovers to be tucked between the mattress and boxspring in the conventional manner.

What is claimed:

1. An adjustable bed unit for elevating one end section of a mattress from the plane of the remainder of the mattress simultaneously in two stages and at differential angles to create and maintain an area of said end section adjacent the juncture of the end section with said remainder of the mattress in a smooth, substantially concave arcuately curved configuration comprising a sectional support means divided into a plurality of substantially planar sections, said support means including an elongate body section having a longitudinal axis and extending in a first plane and a pivoted end assembly means connected to said body section and adapted to extend substantially in said first plane, said pivoted end assembly means including an intermediate section having a first end pivotally connected by a first pivot means to one end of said body section and a second end opposite to said first end, and a head section pivotally connected by a second pivot means to the second end of said intermediate section, said head section having a free end spaced from said second pivot means, said body section including a first rigid base means, said intermediate section including a second rigid base means, said first pivot means being connected between said second rigid base means and one end of said first rigid base means, and said head section including a third rigid base means, said second pivot means being connected between said second rigid base means and said third rigid base means, said first, second and third rigid base means being substantially equal in width, said first rigid base means being longer than said third rigid base means and said third rigid base means being longer than said second rigid base means, said second and third rigid base means having a combined length which is no more than one-half the length of said first rigid base means, said sectional support means including resilient body means having upper support surface means spaced above said first, second and third rigid base means and resilient means extending between at least said first and third rigid base means and said upper support surface, said upper support surface means including longitudinal, spaced first and second border support means extending respectively along opposite sides of said sectional support means, each said border support means including a first border wire section extending above said first rigid base means and terminating at a first wire end spaced above and over said second rigid base means, a second border wire section extending above said third rigid base means and terminating at a second wire end spaced above and over said second rigid base means and spaced from said first wire end, and hinge means extending between said first and second wire ends, said hinge means including an elongate central link spaced between said first and second wire ends and said second rigid base means, and first and second elongate pivot links extending outwardly from said first and second wire ends respectively to opposite ends of said elongate central link, one end of said first and second elongate pivot links being pivotally connected to said first and second wire ends respectively and an opposite end of said first and second elongate pivot links being pivotally connected to said elongate central link, and elevating means connected to said support means for simultaneously moving said intermediate and head sections in the same direction either away from or toward the plane of said body section in a manner to maintain said free end of said head section further from said first plane than the remainder of said pivoted end assembly means when said end assembly means is moved from said first plane, said elevating means being connected to said head section and operable to directly move said head section to initiate simultaneous movement of the head and intermediate sections to pivot said intermediate section about said first pivot means and to pivot said head section about said second pivot means to create a first angle between said intermediate section and said body section and a second angle between said intermediate section and said head section.

2. The adjustable bed unit of claim 1, wherein said resilient means extend only between said first and third rigid base means and said upper support surface.

3. The adjustable bed unit of claim 2, wherein said resilient means include a plurality of coil springs.

4. The adjustable bed unit of claim 3, wherein said hinge means for said first and second border support means are positioned in alignment on opposite sides of said second rigid base means.

5. The adjustable bed unit of claim 1, wherein said resilient means include a plurality of wire grid junctions, and wherein strap means are secured to said sectional support means for maintaining a mattress in alignment thereon, each said strap means including an elongate strap, attachment means secured to one end of said strap for securing the strap to a wire grid junction, said attachment means including a locking member extending substantially perpendicular to the strap for insertion through said upper support surface means for engagement with said wire grid junction.

6. The adjustable bed unit of claim 1, which includes a mattress mounted upon said sectional support means and means securing said mattress to said elongated body section to maintain said mattress in a position of alignment thereon.

7. The adjustable bed unit of claim 1, wherein said elevating means simultaneously moves said head and intermediate sections to a plurality of angular positions between a first position in the plane of said body section and a second position above the plane of said body section, the relative angles between said intermediate section and the longitudinal axis of said body section and said head section and the longitudinal axis of said body section being greater than ninety degrees in all said angular positions.

8. An adjustable bed unit for elevating one end section of a mattress from the plane of the remainder of the mattress simultaneously in two stages and at differential angles to create and maintain an area of said end section adjacent the juncture of the end section with said remainder of the mattress in a smooth, substantially concave arcuately curved configuration comprising a sectional support means divided into a plurality of substantially planar sections, said support means including an elongate body section having a longitudinal axis and extending in a first plane and a pivoted end assembly means connected to said body section and adapted to extend substantially in said first plane, said pivoted end assembly means including an intermediate section having a first end pivotally connected by a first pivot means to one end of said body section and a second end opposite to said first end, and a head section pivotally connected by a second pivot means to the second end of said intermediate section, said head section having a free end spaced from said second pivot means, a mattress mounted upon said sectional support means and means securing said mattress to said elongated body section to maintain said mattress in a position of alignment thereon, said mattress including an upper surface and a lower surface spaced from said upper surface, longitudinally extending, spaced upper and lower border support units extending along opposite sides of said mattress, each said upper and lower border support unit including a first wire section extending under said mattress upper surface and terminating at a first end, a second wire section extending under said mattress upper surface and terminating at a second end spaced from said first end, a third wire section extending above said mattress lower surface and spaced beneath said first wire section and terminating at a third end beneath said first end and a fourth wire section extending above said mattress lower surface and spaced beneath said second wire section and terminating at a fourth end beneath said second end and spaced from said third end, and hinge means spaced substantially centrally between said mattress upper and lower surfaces, said hinge means including a central link with first and second spaced pivot means at opposite ends thereof, a first resilient member pivoted about said first pivot means and having a pair of spaced legs extending outwardly from said first pivot means and connected respectively to the second end of said second wire section and the fourth end of said fourth wire section and a second resilient member pivoted about said second pivot means and having a pair of spaced legs extending outwardly from said second pivot means and connected respectively to the first end of said first wire section and the third end of said third wire section, the spaced legs of each said first and second resilient members being compressible towards each other against spring tension, and elevating means connected to said support means for simultaneously moving said intermediate and head sections in the same direction either away from or toward the plane of said body section in a manner to maintain said free end of said head section further from said first plane than the remainder of said pivoted end assembly means when said end assembly means is moved from said first plane, said elevating means being connected to said head section and operable to directly move said head section to initiate simultaneous movement of the head and intermediate sections to pivot said intermediate section about said first pivot means and to pivot said head section about said second pivot means to create a first angle between said intermediate section and said body section and a second angle between said intermediate section and said head section.

9. A box spring for use with an adjustable bed unit for elevating one end section of a mattress from the plane of the remainder of the mattress comprising an upper wire grid section having a plurality of spaced, substantially perpendicularly oriented grid wires, said grid wires crossing one another to form a juncture of two wires at each crossing point, border wire means formed to define the periphery of said wire grid section, cover means overlying said wire grid section, at least one elongated strap means on the side of said cover means opposite said wire grid section and separated from said wire grid section by said cover means, and attachment means extending through said cover means to attach said strap means to said wire grid section, said attachment means including a locking means secured to a juncture of two grid wires which is spaced a substantial distance from said border wire means and shank means extending from said locking means through said cover means to said strap means.

10. The box spring of claim 9, wherein said locking means includes a substantially U-shaped clip spanning said juncture of two grid wires, said clip having spaced upper and lower legs joined at one end by a bridge section positioned on one side of said juncture, said upper and lower legs having aligned apertures formed therein, said shank means extending through said aligned apertures on the side of said juncture opposite to said bridge section.

11. The box spring of claim 9 which includes a head end, a foot end, and two opposed sides joining said head and foot ends, at least one elongated strap means and attachment means therefor being provided adjacent each side and the foot end of said box spring.

12. The box spring of claim 11, wherein each said strap means includes a free end opposite to and spaced from the attachment means, said free end including fastening means to permit said free end to be fastened to a mattress.

13. An adjustable bed unit for elevating one end section of a mattress from the plane of the remainder of the mattress comprising a sectional support means divided into a plurality of substantially planar sections, said support means including an elongate body section having a longitudinal axis and extending in a first plane and a pivoted end assembly means pivotally connected to said body section and adapted to extend substantially in said first plane, elevating means connected to said support means for simultaneously moving said pivoted end assembly means either away from or toward the plane of said body section in a manner to maintain said free end of said head section further from said first plane than the remainder of said pivoted end assembly means when said end assembly means is moved from said first plane, a box spring mounted upon said sectional support means to overlie at least said body section, said box spring including an upper wire grid section having a plurality of spaced, substantially perpendicularly oriented grid wires, said grid wires crossing one another to form a juncture of two wires at each crossing point, border wire means formed to define the periphery of said wire grid section, cover means overlying said wire grid section, at least one elongate strap means on the side of said cover means opposite said wire grid section and separated from said wire grid section by said cover means, and attachment means extending through said cover means to attach said strap means to said wire grid section, said attachment means including a locking means secured to a juncture of two grid wires which is spaced a substantial distance from said border wire means and shank means extending from said locking means through said cover means to said strap means.

14. The adjustable bed unit of claim 13, wherein said locking means includes a substantially U-shaped clip spanning said juncture of two grid wires, said clip having spaced upper and lower legs joined at one end by a bridge section positioned on one side of said juncture, said upper and lower legs having aligned apertures formed therein, said shank means extending through said aligned apertures on the side of said juncture opposite to said bridge section.

15. The adjustable bed unit of claim 13, wherein said box spring includes a foot end and two spaced, opposed sides extending away from said foot end, at least one elongated strap means and attachment means therefore being provided adjacent to each side and the foot end of said box spring.

16. A bed unit having at least two sections which are relatively movable comprising a first section, a second section, each said first and second sections including border support means, the border support means for said first section including a first border wire section and the border support means for said second section including a second border wire section spaced from but adjacent to said first border wire section, and hinge means extending between said first and second border wire sections and being connected thereto, said hinge means including an elongate central link spaced between said first and second border wire sections and first and second elongate pivot links extending downwardly from said first and second border wire sections respectively to opposite ends of said elongate central link, one end of said first and second elongate pivot links being pivotally connected to said first and second border wire sections respectively and an opposite end of said first and second elongate pivot links being pivotally connected in spaced relationship to said elongate central link.

17. The bed unit of claim 16 wherein said first and second border wire sections are substantially coextensive, said first border wire section terminating at a first wire end and said second border wire section terminating at a second wire end spaced from said first wire end, said hinge means extending between said first and second wire ends with said first and second elongate pivot links extending downwardly from said first and second wire ends respectively.

18. The bed unit of claim 17 wherein said first and second sections each include a top surface and a bottom surface spaced beneath said top surface, said border support means extending beneath and adjacent to said top surface, the border support means for said first section further including a third border wire section extending substantially parallel to and spaced from said first border wire section and terminating at a third wire end, the border support means for said second section further including a fourth border wire section terminating at a fourth wire end adjacent to and spaced from said third wire end, said fourth border wire section being substantially coextensive with said third border wire section and extending substantially parallel to and spaced from said second border wire section, and second hinge means extending between said third and fourth border wire sections and being connected thereto in spaced, substantially aligned relationship with said hinge means, said second hinge means including an elongate central link spaced between said third and fourth wire ends and first and second elongate pivot links extending downwardly from said third and fourth wire ends respectively to opposite ends of said elongate central link, one end of said first and second elongate pivot links being pivotally connected to said third and fourth wire ends respectively and an opposite end of said first and second elongate pivot links being pivotally connected to said elongate central link.

19. A bed unit having at least two sections which are relatively movable comprising a first section, a second section, each said first and second section including border support means, the border support means for said first section including a first border wire support means terminating at a first end and a second border wire support means extending substantially parallel to and spaced beneath said first border wire support means and terminating at a second end, and the border support means for said second section including a third border wire support means extending substantially coextensively with said first border wire support means and terminating at a third end spaced from said first end and a fourth border wire support means extending substantially coextensively with said second border wire support means and terminating at a fourth end spaced from said second end, and hinge means spaced substantially centrally between said first and second and third and fourth ends respectively, said hinge means including a central link with first and second spaced pivot means at opposite ends thereof, first connection means pivoted about said first pivot means and connected to said first and second ends and second connection means pivoted about said second pivot means and connected to said third and fourth ends.

20. The bed unit of claim 19 wherein said first and second connection means each include a resilient member pivoted about either said first or second pivot means and having a pair of spaced legs extending outwardly and connected to either said first and second or third and fourth ends, said spaced legs being compressible towards each other against spring tension.

21. The bed unit of claim 20 wherein said first and second sections each include at least two spaced, substantially parallel border support means.

* * * * *